(12) United States Patent
Takehi

(10) Patent No.: US 7,712,129 B2
(45) Date of Patent: May 4, 2010

(54) SYSTEM, METHOD AND PROGRAM FOR USER AUTHENTICATION, AND RECORDING MEDIUM ON WHICH THE PROGRAM IS RECORDED

(75) Inventor: Masahiro Takehi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 10/598,875

(22) PCT Filed: Feb. 14, 2005

(86) PCT No.: PCT/JP2005/002143

§ 371 (c)(1),
(2), (4) Date: Sep. 14, 2006

(87) PCT Pub. No.: WO2005/101220

PCT Pub. Date: Oct. 27, 2005

(65) Prior Publication Data

US 2007/0199059 A1 Aug. 23, 2007

(30) Foreign Application Priority Data

Mar. 30, 2004 (JP) .............................. 2004-099243

(51) Int. Cl.
*G06F 15/16* (2006.01)
*G06F 17/30* (2006.01)

(52) U.S. Cl. .................. 726/6; 726/1; 726/28; 713/186

(58) Field of Classification Search ........................ None
See application file for complete search history.

(56) References Cited

U.S. PATENT DOCUMENTS 5,948,064 A * 9/1999 Bertram et al. ............. 709/225

(Continued)

FOREIGN PATENT DOCUMENTS

JP 2000106552 4/2000

(Continued)

OTHER PUBLICATIONS

Microsoft, Active Directory LDAP Compliance, Oct. 2003, Microsoft Corporation, Microsoft Windows Server 2003 WhitePaper, pp. 1-13.*

(Continued)

*Primary Examiner*—William R Korzuch
*Assistant Examiner*—Michael R Vaughan
(74) *Attorney, Agent, or Firm*—Schmeiser, Olsen & Watts; William H. Steinberg

(57) ABSTRACT

Method and system for user authentication in a federated computing environment. The method includes a first method for recording server authentication information, including: establishing a trusting relationship between a first and second server, obtaining an authentication policy of the second server, and registering the authentication policy of the second server within the first server. The method includes a second method for registering new user authentication information of a new user, including: verifying that the new user authentication information conforms to an authentication policy of the first server, and registering the new user authentication information in the first server. The method includes a third method for authenticating a user, including: receiving an access request from the user to access the federated computing environment, receiving notification based on input authentication information that the user has been authorized for the requested access, and permitting the user to access the federated computing environment.

21 Claims, 8 Drawing Sheets

U.S. PATENT DOCUMENTS

| | | | | |
|---|---|---|---|---|
| 5,963,915 | A * | 10/1999 | Kirsch | 705/26 |
| 6,021,496 | A * | 2/2000 | Dutcher et al. | 726/21 |
| 6,449,615 | B1 * | 9/2002 | Liu et al. | 707/10 |
| 6,832,377 | B1 | 12/2004 | Havemose | |
| 2001/0019614 | A1 * | 9/2001 | Madoukh | 380/277 |
| 2001/0048025 | A1 * | 12/2001 | Shinn | 235/382 |
| 2002/0091928 | A1 * | 7/2002 | Bouchard et al. | 713/178 |
| 2002/0112045 | A1 * | 8/2002 | Nirkhe et al. | 709/223 |
| 2002/0194499 | A1 * | 12/2002 | Audebert et al. | 713/201 |
| 2003/0149781 | A1 * | 8/2003 | Yared et al. | 709/229 |
| 2003/0163733 | A1 * | 8/2003 | Barriga-Caceres et al. | 713/201 |
| 2003/0237004 | A1 | 12/2003 | Okamura | |
| 2004/0002878 | A1 * | 1/2004 | Maria Hinton | 705/7 |
| 2004/0107212 | A1 * | 6/2004 | Friedrich et al. | 707/104.1 |
| 2004/0128393 | A1 * | 7/2004 | Blakley et al. | 709/229 |
| 2004/0139319 | A1 * | 7/2004 | Favazza et al. | 713/168 |
| 2004/0162996 | A1 * | 8/2004 | Wallace et al. | 713/201 |
| 2004/0204949 | A1 * | 10/2004 | Shaji et al. | 705/1 |
| 2004/0210767 | A1 * | 10/2004 | Sinclair et al. | 713/201 |
| 2004/0230831 | A1 * | 11/2004 | Spelman et al. | 713/201 |
| 2005/0114673 | A1 * | 5/2005 | Raikar et al. | 713/182 |
| 2005/0114701 | A1 * | 5/2005 | Atkins et al. | 713/201 |
| 2005/0144452 | A1 * | 6/2005 | Lynch et al. | 713/170 |

FOREIGN PATENT DOCUMENTS

| | | |
|---|---|---|
| JP | 2000311138 | 11/2000 |
| JP | PUPA2000311138 | 11/2000 |
| JP | PUPA2003224562 | 8/2003 |
| JP | 2004070416 | 3/2004 |

OTHER PUBLICATIONS

Web Service Federation Language (WS-Federation) Version 1.0 Jul. 8, 2003 IBM/Microsoft/Verisign pp. 1-41.

* cited by examiner

[Figure 1]
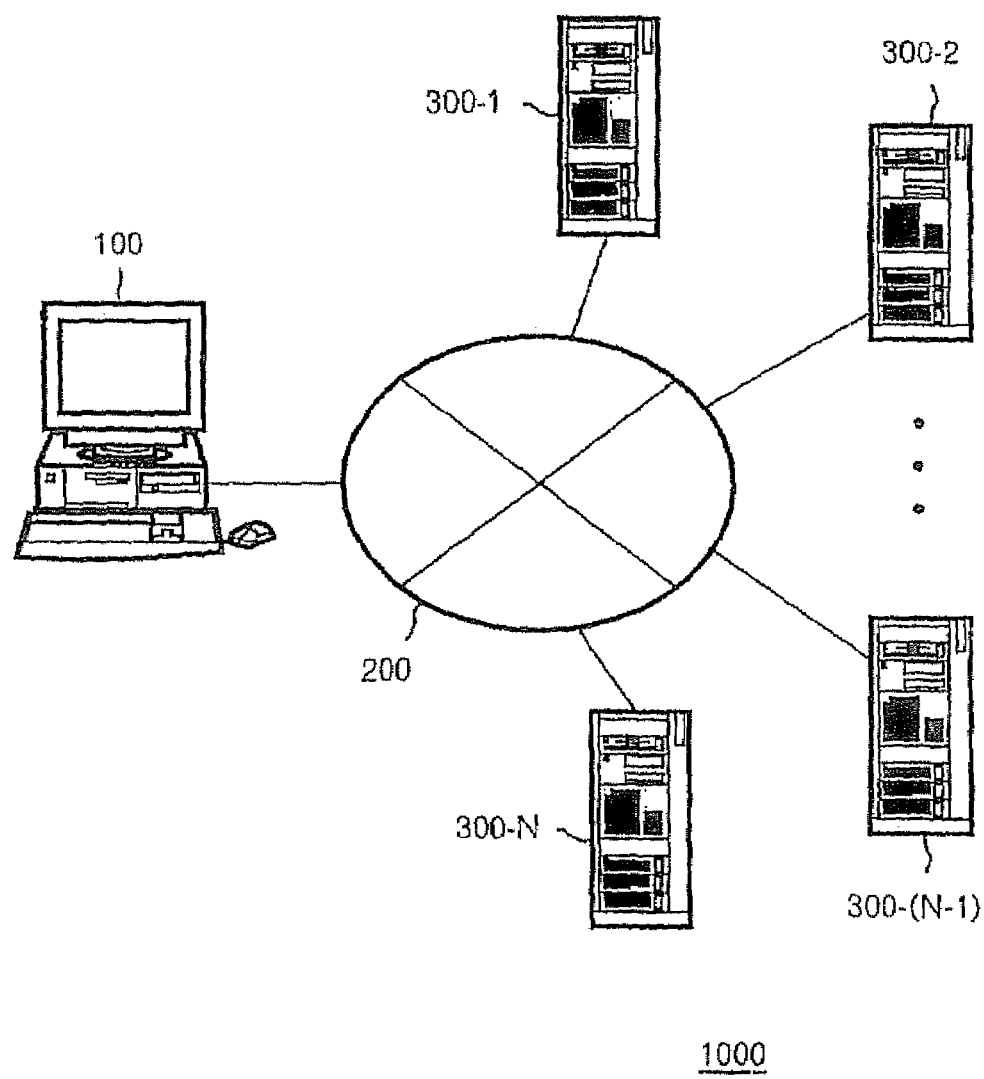

[Figure 2]
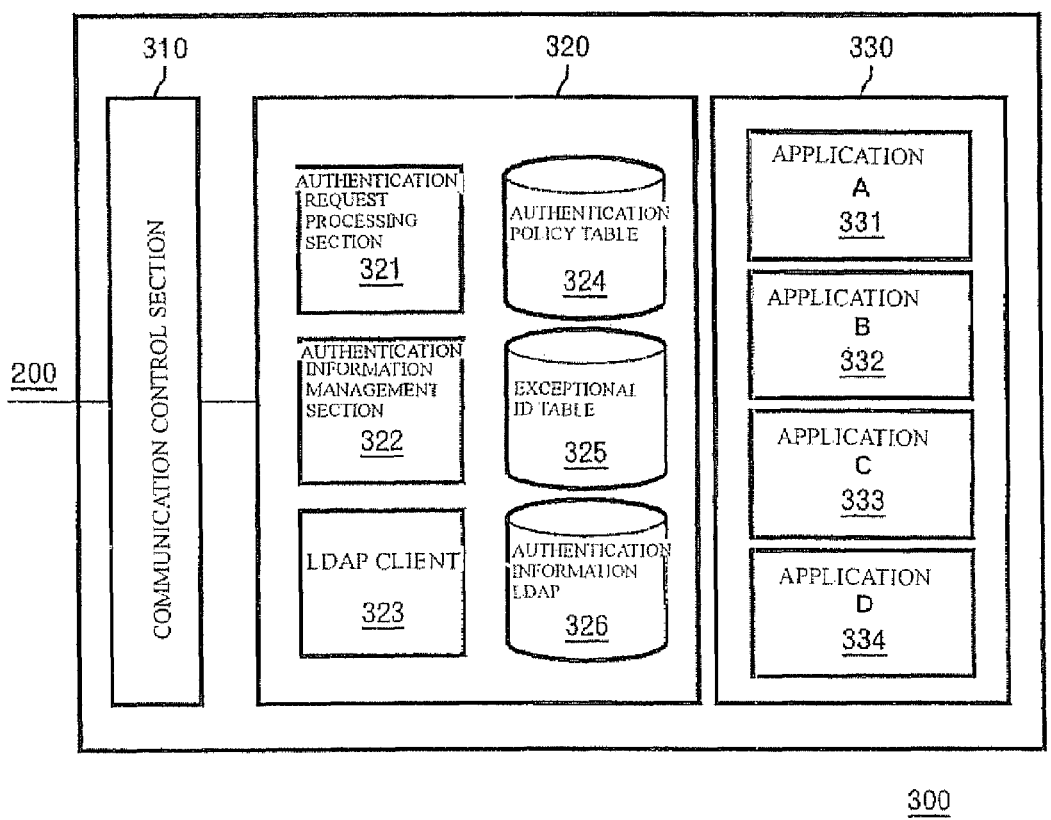

[Figure 3]
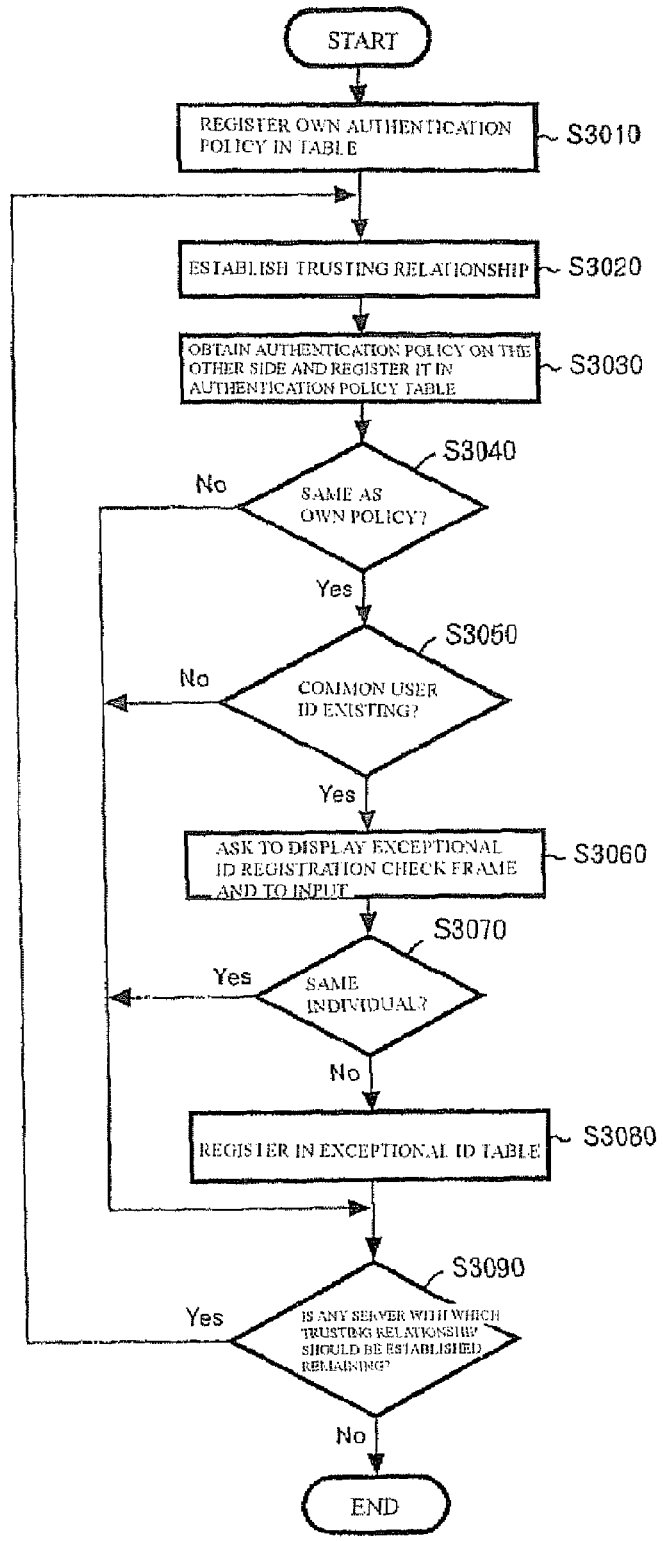

[Figure 4]
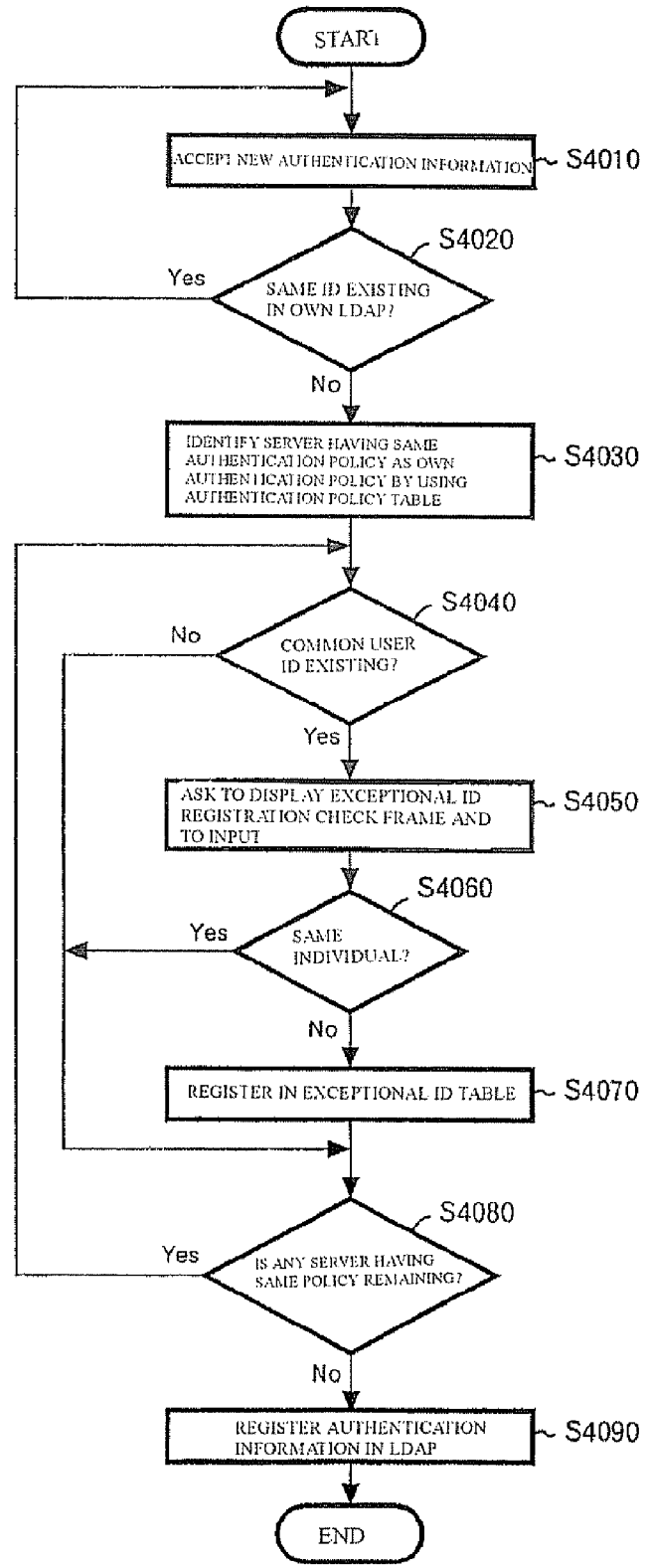

[Figure 5]
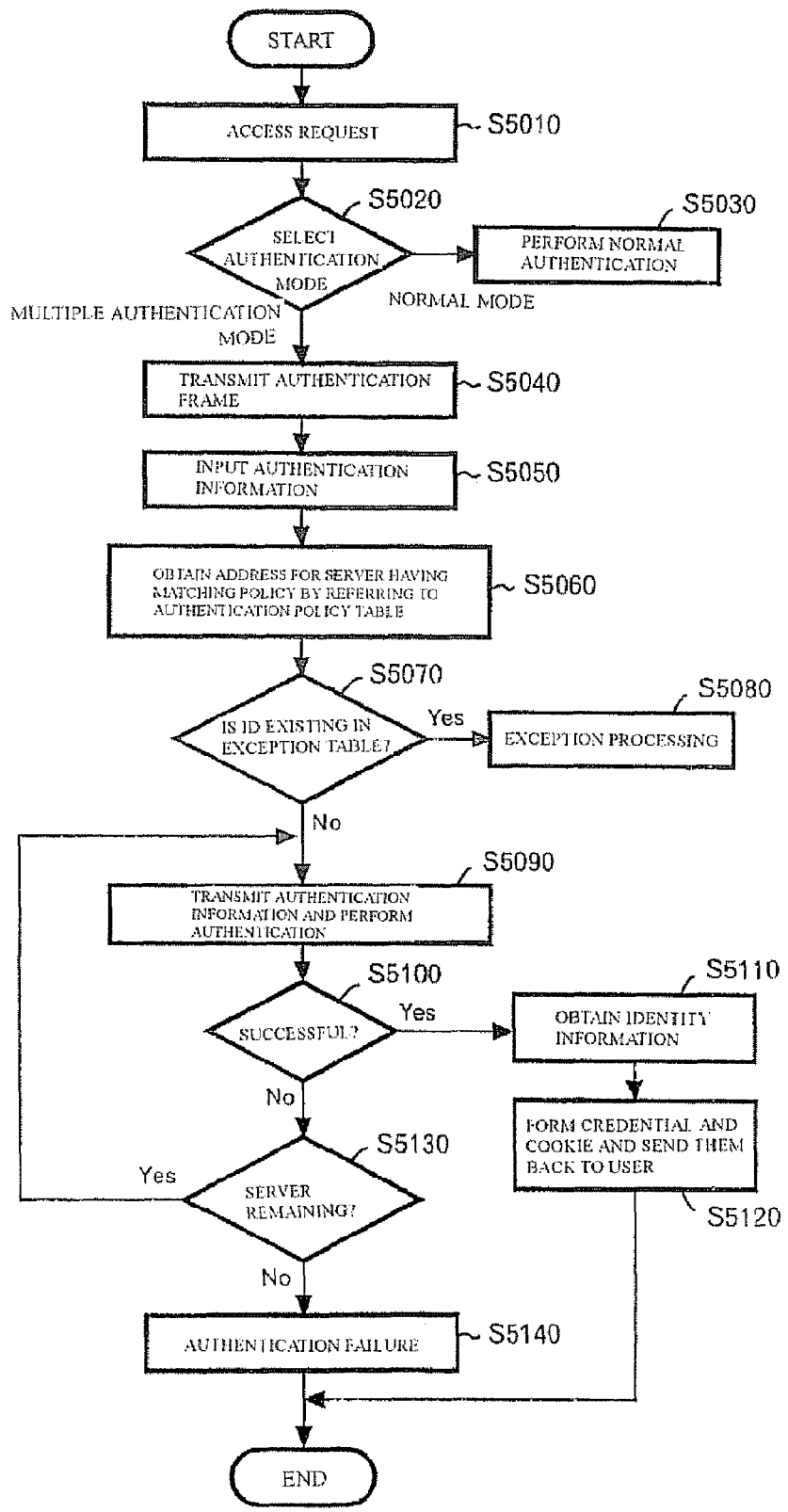

[Figure 6]
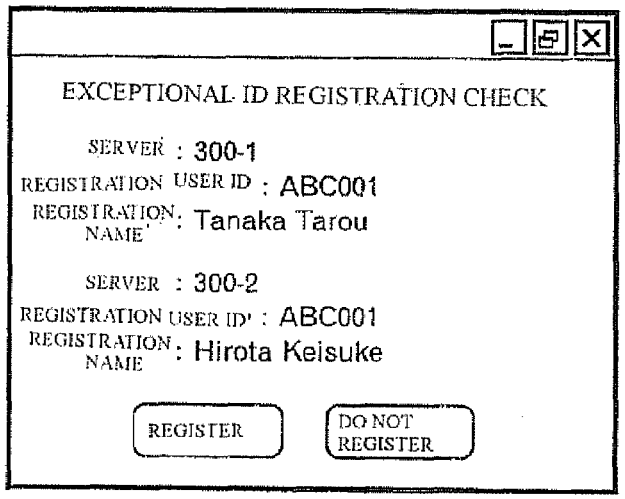
[Figure 7]
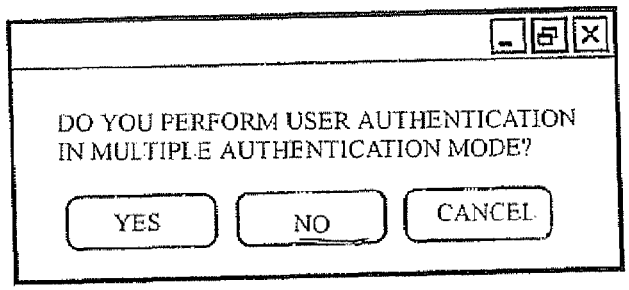
[Figure 8]
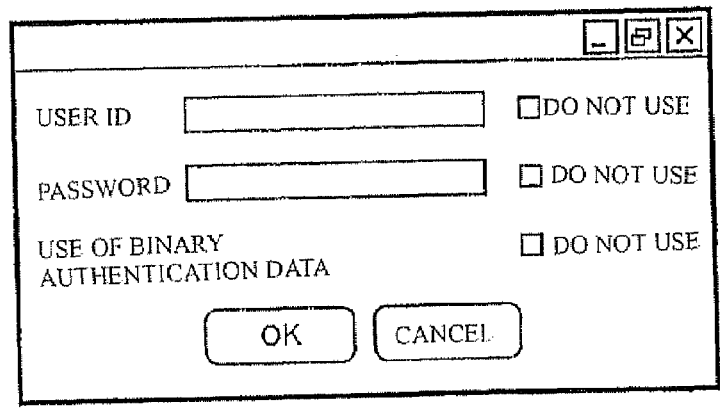

[Figure 9]

(A REPRESENTING ALPHABETIC CHARACTER, N REPRESENTING NUMERIC CHARACTER)

| AUTHENTICATION POLICY | SERVER ADDRESS | PRIORITY |
|---|---|---|
| USER ID : AAANNN<br>PASSWORD : AAAA | server300-1.com | 1 |
| | server300-2.com | 2 |
| | server300-3.com | 3 |
| USER ID : AAAAAAAA<br>PASSWORD : OPTIONAL | server300-4.com | 1 |
| | server300-5.com | 2 |
| FINGERPRINT AUTHENTICATION<br>BINARY SIZE : 100 bytes | server300-6.com | 1 |
| | server300-7.com | 2 |
| VOICE PRINT AUTHENTICATION<br>BINARY SIZE : 200 bytes | server300-8.com | — |

[Figure 10]

| SERVER ADDRESS | EXCEPTIONAL ID |
|---|---|
| server300-1.com | ABC001, DEF002, GHI003 |
| server300-2.com | ABC001, DEF002 |
| server300-3.com | ABC001, GHI003 |
| server300-4.com | ABCDEFGH |
| server300-5.com | ABCDEFGH |
| server300-6.com | NONE |
| server300-7.com | NONE |
| server300-8.com | NONE |

[Figure 11]
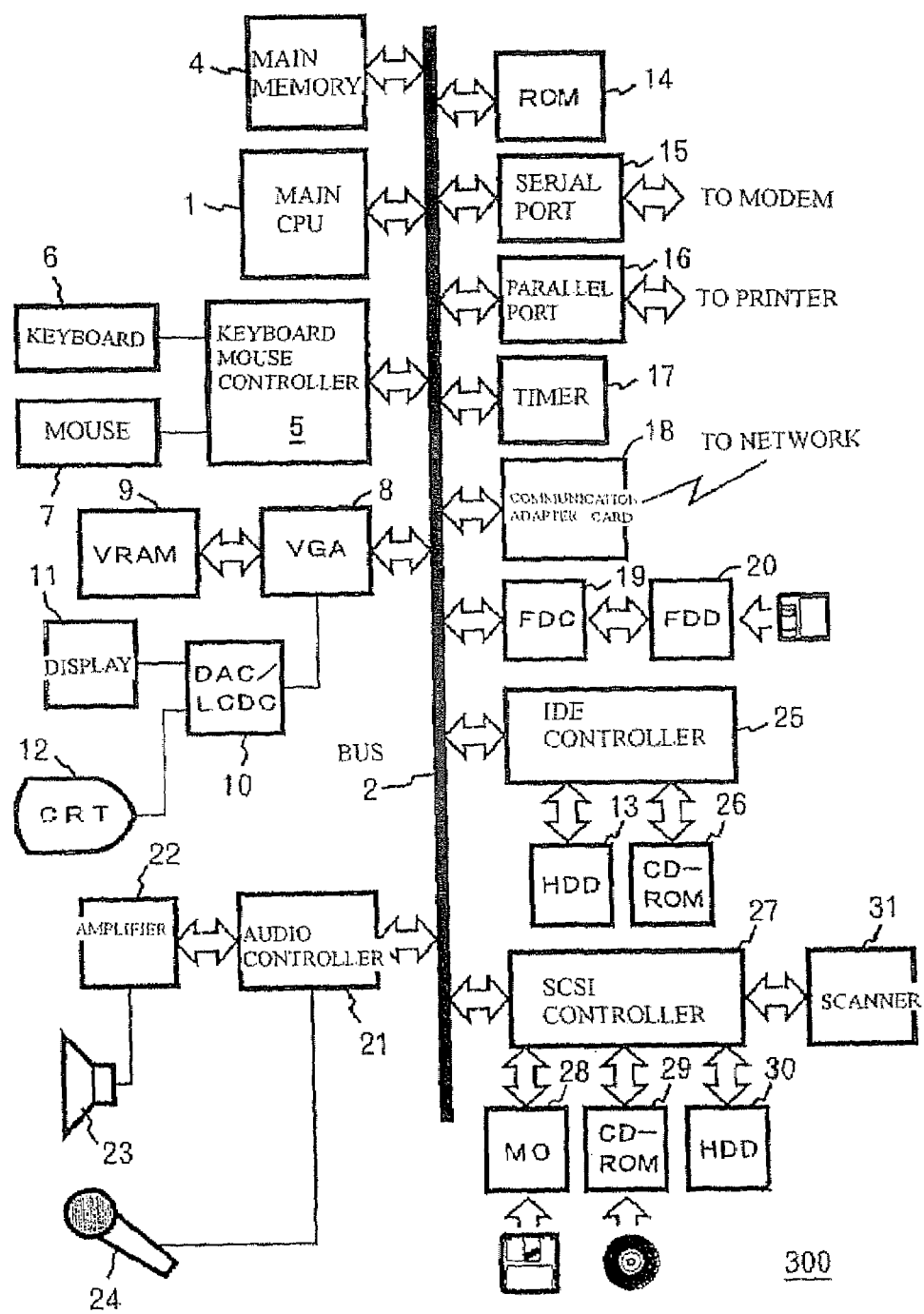

SYSTEM, METHOD AND PROGRAM FOR USER AUTHENTICATION, AND RECORDING MEDIUM ON WHICH THE PROGRAM IS RECORDED

FIELD OF THE INVENTION

The present invention relates generally to a user authentication technique and, more particularly, to a system, method and program for authenticating a user in a federated computing environment.

BACKGROUND ART

In recent years, many computer related companies are pursuing the development of Web service related techniques for automatization of business transactions by using the Internet technology. One of objectives to be attained by Web services is to achieve an improvement inefficiency of electronic commercial transactions among a plurality of company systems. More specifically, a Web service provides a mechanism for realizing cooperation between a plurality of company systems in such a manner that a Web-based application program automatically searches for other related application programs.

"WS-Security" which is a security specification for such a Web service has been made public by International Business Machines Corporation, Microsoft Corporation and VeriSign Incorporated (see Hiroshi Maruyama et al., "Web Service Security (WS-Security)", Apr. 5, 2002. Published by International Business Machines Corporation/Microsoft Corporation/VeriSign Incorporated). In "WS-Security", a mechanism for realizing single sign-on in a federated computing environment including a plurality of servers among which relationships of mutual trust are established is defined. "Relationship of mutual trust" or "trusting relationship" refers to a relationship among two or more servers such that if authentication of a user in the authentication system of one of the two or more servers succeeds, the user is treated as an authentic user in the other servers. An instance of a specification for the above-mentioned federation has been made public as "WS-Federation" (see Hiroshi Maruyama et al., "Web Service Federation Language (WS-Federation)", Jul. 8, 2003, Published by International Business Machines Corporation/Microsoft Corporation/VeriSign Incorporated).

In a related art, when a user attempts to utilize a federated computing environment including a plurality of servers, the user performs user authentication by using the authentication system of one of the servers to obtain a security token. The user then puts his/her signature to a SOAP (Simple Object Access Protocol) message including the obtained security token and transmits the SOAP message to some of the servers providing a Web service. The server receiving the SOAP message verifies the security token contained in the SOAP message and sends a service reply to the user in response to a successful result of verification.

If the above-mentioned "WS-security" specification is formally accepted and comes into wide use by being implemented as a product, seamless cooperation between company systems will be accelerated and, for example, a large-scale supply chain system in which a large number of company systems participate will be realized.

DISCLOSURE OF THE INVENTION

Problems to be Solved by the Invention

If in a federated computing environment the authentication systems of all servers use one authentication policy (a concept including all user authentication forms, such as fingerprint authentication, voice print authentication and other authentication forms, rules in individual authentication forms (the number of characters, available term, data size, etc.), and combinations of them), a user may utilize the federated computing environment in such a manner that the user registers one group of authentication information items and perform user authentication by using his/her "unique" authentication information without being conscious of in which server he or she is using the authentication system. Thus, an authentication policy is defined as at least one rule for authenticating users of the federated computing environment.

In ordinary cases, however, the authentication systems of a plurality of servers included in a federated computing environment adopt authentication policies different from each other, because the federated computing environment is pre-arranged to allow a plurality of independently operated systems to participate therein. In a case where first and the second servers included in a federated computing environment adopt different authentication policies due to such a characteristic, a user sets groups of authentication information items conforming to the different authentication policies with respect to the first and second servers.

In such a computing environment, it is necessary for a user to memorize the correspondence between the authentication system of a server and authentication information and to input the authentication information corresponding to the authentication system while being acutely conscious of in which authentication system the user is attempting authentication. Since the number of authentication information items to be memorized by the user increases in proportion to the increase in the number of servers participating in the federated computing environment, it is possible that this operation will become a considerable burden on the user.

SUMMARY OF THE INVENTION

It is, therefore, an object of the present invention to provide a system, method and program for authentication capable of solving the above-described problem.

To solve the above-described problem, according to a first aspect of the present invention, there is provided a user authentication system for performing user authentication for a federated computing environment including a plurality of servers among which relationships of mutual trust have been established. The user authentication system includes an authentication policy table for registering authentication policies of at least one of the plurality of servers, means for receiving authentication information from a user, means for identifying, from among the plurality of servers, a server that adopts an authentication policy to which the authentication information matches with the use of the authentication policy table, means for sending a signal to direct an authentication mechanism of the server identified by the means for identifying a server to perform user authentication with the use of the authentication information, and means for permitting the user to access the federated computing environment on condition of success of the user authentication.

According to a second aspect of the present invention, there is provided a user authentication method in a federated computing environment including a plurality of servers among which relationships of mutual trust have been established. At least one of the plurality of servers holds at least one authentication policy table for registering authentication policies of at least one of the plurality of servers. The method includes the steps of: receiving authentication information from a user, identifying, from among the plurality of servers, a server that adopts an authentication policy to which the authentication information matches with the use of the authentication policy table, sending a signal to direct an authentication mechanism of the server identified in the step of identifying a server to perform user authentication with the use of the authentication information, and permitting the user to access the federated computing environment on condition of success of the user authentication.

According to a third aspect of the present invention, there is provided a user authentication program in a federated computing environment including a plurality of servers among which relationships of mutual trust have been established. At least one of the plurality of servers holds at least one authentication policy table for registering authentication policies of at least one of the plurality of servers. The program causes a computer to execute the steps of receiving authentication information from a user, identifying, from among the plurality of servers, a server that adopts an authentication policy to which the authentication information matches with the use of the authentication policy table, sending a signal to direct an authentication mechanism of the server identified in the step of identifying a server to perform user authentication with the use of the authentication information, and permitting the user to access the federated computing environment on condition of success of the user authentication.

According to a fourth aspect of the present invention, there is provided a computer program product such as a computer readable storage medium on which the above-described user authentication program is recorded.

ADVANTAGE OF THE INVENTION

According to the present invention, more convenient user authentication can be performed in a federated computing environment.

PREFERRED EMBODIMENT

The best mode for carrying out the present invention will be described below in detail with reference to the drawings. It is to be noted that the present invention can be implemented in a number of different forms and should not be construed to be limited to the contents of the following description of an embodiment of the present invention, and that all combinations of features described in the description of the embodiment are not necessarily indispensable to the solution according to the present invention. Throughout the entire description of the embodiment, the same components are indicated by the same reference characters.

Description will be made mainly of a method and a system in the embodiment. However, it is apparent to those skilled in the art that the present invention can also be implemented as a program usable in a computer. Therefore, the present invention can be implemented as a piece of hardware, a piece of software or a combination of a piece of hardware and apiece of software. The program can be recorded on any of computer-readable mediums such as a hard disk, a CD-ROM, an optical storage and a magnetic storage.

FIG. 1 is a diagram schematically showing an example of a system configuration in a federated computing environment 1000 in an embodiment of the present invention. The federated computing environment 1000 includes a client 100 and a plurality of servers 300-1 to 300-N (hereinafter referred to as "server 300" as occasion demands) connected to each other through a network 200.

The client 100 is a terminal which can be connected to the well-known Internet. A person skilled in the art can easily implement the client 100. A connection between the client 100 and the network 200 may be established as a dial-up connection or the like through an ISP (Internet Service Provider (not shown)). The connection from the client 100 to the ISP is not limited to the dial-up connection. For example, a full-time connection may be made by using a private line, a LAN (Local Area Network), a WAN (Wide Area Network), an ADSL (Asymmetric Digital Subscriber Line) or a CATV (Cable Television) network.

The network 200 is a communication network through which client 100 and the server 300 are connected to each other. The network 200 can be implemented as the Internet. In the network 200 implemented as the Internet, a connection is established between systems by using TCP/IP (Transmission Control Protocol/Internet Protocol). In the network 200, systems communicating each other are identified from IP addresses represented by global addresses or local addresses.

Each server 300 is a computer unit which provides a service according to a request from the client 100. More specifically, the servers 300-1 to 300-N provide Web services according to a service request from the client 100 by using a well-known Web service technique and by cooperating with each other. Preferably, the servers 300-1 to 300-N form, in accordance with the above-mentioned WS-Federation specification, the federated computing environment 1000 in which a relationship of mutual trust is established.

FIG. 2 is a functional block diagram of the server 300 in this embodiment. Each of components shown in the functional block diagram of FIG. 2 can be implemented by making a hardware resource and a piece of software cooperate with each other in a computer having a hardware configuration shown in FIG. 11 and described below.

The server 300 includes a communication control section 310, a user authentication processing section 320 and an application execution section 330. The communication control section 310 transfers data received from the network 200 to the user authentication processing section 320 or the application execution section 330. The communication control section 310 can also sends out to the network 200 data received from the user authentication processing section 320 or the application execution section 330.

The user authentication processing section 320 performs authentication processing according to an access request made by a user using the client 100 and received through communication control section 310. Preferably, the access request is implemented as an HTTP (HyperText Transfer Protocol) request generated in a Web browser in the client 100, sent out to the network 200 and received by the server 300, but is not limited. The user authentication processing section 320 includes an authentication request processing section 321, an authentication information management section 322, a Lightweight Directory Access Protocol (LDAP) client 323, an authentication policy table 324, an exceptional ID table 325 and authentication information LDAP 326.

The authentication request processing section 321 analyzes an access request from the user of the client 100 and executes user authentication if the result of analysis is that the user who has transmitted the access request is unauthenticated. The authentication request processing section 321 executes user authentication by referring to the authentication policy table 324 and cooperating with the authentication systems of the other servers included in the federated computing environment 1000.

More specifically, the authentication request processing section 321 has the function of transmitting to the client 100 data on a Web page through which the user of the client 100 who has transmitted an access request is asked to input authentication information in response to the result of determination that the user is unauthenticated. The authentication request processing section 321 also has the functions of receiving user authentication information input by using the authentication information input Web page, identifying one of the plurality of servers in the federated computing environment 1000 having a authentication policy in the authentication system of the server to which the above-described authentication information conforms, and transmitting a signal for a command to execute user authentication by using the authentication information in the authentication mechanism of the authentication system of the identified server.

The authentication request processing section 321 has the authentication mechanism that, if it is determined that authentication information conforms to the authentication policy of the authentication system, performs collation between this authentication information and authentication information stored in the authentication information LDAP 326 obtained through the LDAP client 323. Further, the authentication request processing section 321 further has the function of transmitting a security token for permitting access to the federated computing environment 1000 to the client 100 when user authentication is successful. Preferably, in this embodiment, the security token is a credential and cookie.

The authentication information management section 322 performs management of authentication information in the federated computing environment 1000. Preferably, the authentication information management section 322 has the function of performing processing for registering in the authentication policy table 324 of the authentication policies of the authentication systems of the servers included in the federated computing environment 1000, processing for updating the policies and processing for reference to the policies. The authentication information management section 322 also has the function of registering in the authentication information LDAP authentication information received from the user through the LDAP client 323. The authentication information management section 322 further has the function of determining, when a user identification (ID) for a new user is registered, whether or not the same user ID has already been registered in the authentication system of any of the other servers using the same authentication policy, and registering the user ID in the exceptional ID table 325 if it determines that the same ID has been registered.

The LDAP client 323 provides an interface with the authentication information LDAP 326. More specifically, the LDAP client 323 has the function of controlling access to the authentication information LDAP 326 from a program component of the server 300 or from any of the other computers. The LDAP client 323 can register in the authentication information LDAP 326 at least authentication information received from the authentication information management section 322, and can take out authentication information registered in the authentication information LDAP 326 according to a request from the authentication request processing section 321 or the like.

The authentication policy table 324 is a table in which the authentication policies of the authentication systems of the servers included in the federated computing environment 1000 are registered.

FIG. 9 is a diagram showing an example of the authentication policy table 324 in the embodiment of the present invention. In the authentication policy table 324, address locations for part or all of the servers included in the federated computing environment 1000 (preferably, URL addresses for the servers) are registered while being related to authentication policies. In the authentication policy table 324 shown in FIG. 9 by way of example, authentication policies are registered in the first column and addresses for the servers using the authentication policies in the first column are registered in the second column.

Preferably, address locations for all the servers included in the federated computing environment 1000 and authentication policies used by all the servers are registered in the authentication policy table 324. However, it is to be noted that access to the federated computing environment 1000 in this embodiment is permitted according to success in user authentication with respect to one of the servers for which address locations and authentication policies are registered in the authentication policy table 324, as described below, and, therefore, processing for user authentication in this embodiment can be performed even if no address locations and authentication policies for the servers included in the federated computing environment 1000 are registered.

If a plurality of servers using the same authentication policies exist, priorities indicating from which server user authentication in the authentication systems should be performed are registered in the authentication policy table 324 in this embodiment of the present invention while being related to the server addresses. Values for priorities may be manually input by a system administrator or may be automatically determined in such a manner that priority values are assigned in order of decreasing number of users registered in the authentication systems.

More specifically, three servers using an authentication policy such that a user ID formed of "three alphabetic characters+three numeric characters" and a password formed of "four alphabetic characters" (having addresses "server300-1.com", "server300-2.com", and "server300-3.com") are registered in the authentication policytable 324 in this embodiment of the present invention. Two servers using an authentication policy such that a user ID formed of "eight alphabetic characters" and a password is "arbitrary" (having addresses "server300-4.com" and "server300-5.com") are also registered.

Further, in the authentication policy table 324 are also registered two servers using an authentication policy such that "fingerprint authentication" is performed and the size of binary data for fingerprint authentication is "100 bytes" (having addresses "server300-6.com" and "server300-7.com") and one server using an authentication policy such that "voice print authentication" is performed and the size of binary data for voice print authentication is "200 bytes" (having an address "server300-8.com").

The exceptional ID table 325 is a table in which a user ID used by one user is registered as an exceptional ID if the same user ID is used by another user among the authentication systems of at least two servers included in the federated computing environment 1000.

FIG. 10 is a diagram showing an example of the exceptional ID table 325 in this embodiment of the present invention. In the exceptional ID table 325, address locations for part or all of the servers included in the federated computing environment 1000 (preferably, URL addresses for the servers) are registered while being related to exceptional IDs. In the exceptional ID table 325 shown in FIG. 10 by way of example, server addresses are registered in the first column and exceptional IDs in the authentication systems of the servers indicated in the first column are registered in the second column.

The application execution section 330 executes various application programs according to requests from the server in the client 100 and/or the servers included in the federated computing environment 1000 to meet a service request from an authenticated user. Preferably, application programs to be executed by the application execution section 330 are implemented as Web-based application programs. In this embodiment of the present invention, four kinds of applications: an application A (331), an application B (332), an application C (333) and an application D (334) can be executed.

FIG. 3 is a flowchart showing the flow of operations for establishing trusting relationships among the plurality of servers. In this embodiment, in a case where relationships of mutual trust are established among the plurality of servers 300-1 to 300-N, the server 300-1 first establishes, by the flow of operations shown in FIG. 3, trusting relationships with the server 300-2 to 300-N with which it has established no trusting relationships. Subsequently, the server 300-2 also establishes, by the flow of operations shown in FIG. 4, trusting relationships with the server 300-3 to 300-N with which it has established no trusting relationships. This process is repeated to processing in the server 300-(N−1) to establish relationships of mutual trust among all the plurality of servers 300-1 to 300-N, thus forming the federated computing environment 1000.

The flow of operations shown in FIG. 3 will be described in detail with respect to the case where the server 300-1 establishes trusting relationships with the servers 300-2 to 300-N. The server 300-1 first registers its authentication policy in the authentication policy table 324 (S3010). The server 300-1 then establishes a trusting relationship between the server 300-1 and the server 300-2 by exchanging electronic certificates in accordance with the well-known PKI (Public Key Infrastructure) method (S4020).

Subsequently, the server 300-1 obtains the authentication policy of the server 300-2 with which a trusting relationship is established in S3020. More specifically, the server 300-1 obtains the authentication policy of the server 300-2 by accessing a profile table which is prepared by the administrator of the server 300-2 existing locally, and in which the authentication policy is described.

The server 300-1 registers the authentication policy of the server 300-2 in the authentication policy table 324 (S3030) and determines whether or not its own authentication policy and the authentication policy of the obtained server 300-2 are identical (S3040). If it is determined that the authentication policy of the server 300-1 and the authentication policy of the server 300-2 are not identical, a move to S3090 corresponding to the arrow for "No" is made for determination as to whether or not a trusting relationship is still to be established with one of the other servers.

If it is determined in S3040 that the authentication policy of the server 300-1 and the authentication policy of the server 300-2 are identical, an advance to S3050 corresponding to the arrow for "Yes" is made to examine whether or not a common user ID exists both in the authentication information LDAP 326 in the server 300-1 and in the authentication information LDAP 326 in the server 300-2. If it is determined in S3050 that no common user ID exists both in the authentication information LDAP 326 in the server 300-1 and in the authentication information LDAP 326 in the server 300-2, a move to S3090 corresponding to the arrow for "No" is made for determination as to whether or not a trusting relationship is still to be established with one of the other servers.

If it is determined in S3050 that a common user ID exists both in the authentication information LDAP in the server 300-1 and in the authentication information LDAP in the server 300-2, an advance to step S3060 corresponding to the arrow for "Yes" is made to display an exceptional ID registration check frame shown in FIG. 6 on the terminal operated by the system administrator attempting to establish a trusting relationship between the servers. In this embodiment, if a user ID "ABC001" is registered in both the server 300-1 and the server 300-2, the system administrator is asked to check whether or not the user ID are used by one user. In the exceptional ID registration check frame, registered names ("Tanaka Taro" provided as a registration name in combination with the user ID "ABC001" in the server 300-1, and "Hirota Keisuke" provided as a registration name in combination with the user ID "ABC001" in the server 300-2) are displayed as a hint for check to be presented to the system administrator, while being related to the server names and the user ID.

An advance to S3070 is then made and the system administrator presses an "Register" button in the exceptional ID check frame if the system administrator has determined that different users are respectively using the servers 300-1 and the server 300-2 from the user ID displayed in the exceptional ID check frame. An advance to S3080 is made in response to pressing of the "Register" button and the user ID is registered in the exceptional ID table 325. Thereafter, a move to S3090 in the flow corresponding to the arrow for "No" is made for determination as to whether or not a trusting relationship is still to be established with one of the other servers.

In S3070, the user presses a "Do not register" button in the exceptional ID check frame if the system administrator has determined that the user ID displayed in the exceptional ID check frame is used in the server 300-1 and the server 300-2 by one user. In response to pressing of the "Do not register" button, a move to S3090 in the flow corresponding to the arrow for "No" is made for determination as to whether or not a trusting relationship is still to be established with one of the other servers.

In S3090, determination is made as to whether or not a trusting relationship is still to be established with one of the other servers in the server 300-1. If it is determined in S3090 that a trusting relationship is still to be established with one of the other servers, a return to S3020 in the flow is made and the steps S3020 to S3080 are executed with respect to the server with which no trusting relationship has been established. The server 300-1 thus establishes trusting relationships with all of the other servers 300-2 to 300-N. If it is determined in S3090 that a trusting relationship is not still to be established with any of the other servers, an advance in the flow corresponding to the arrow for "No" and the flow ends.

Description has been made of the case where the server 300-1 establishes trusting relationships with the other servers 300-2 to 300-N. The same processing is executed with respect to 300-2 to 300-N to form the federated computing environment 1000 in which relationships of mutual trust are established between the servers 300-1 to 300-N.

FIG. 4 is a flowchart showing the flow of operations for registration of new user authentication information. The flow of registration of new user authentication information in the authentication system of the server 300-1 participating in the federated computing environment 1000 in which relationships of mutual trust have already been established between the plurality of servers 300-1 to 300-N will be described in detail with reference to FIG. 4. It is to be noted that the flow of registration of new user authentication information in each of the authentication systems of the other servers 300-2 to 300-N can be implemented as the same processing.

First, new authentication information is accepted from the client 100 operated by a user (S4010). In S4010, the server 300-1 also verifies whether new authentication information conforms to its authentication policy by using a profile table which is prepared by the administrator of the server 300-1 and in which the authentication policy is described. Subsequently, the server 300-1 determines whether or not the same user ID as a user ID contained in the authentication information received from the client 100 exists in its authentication information LDAP 326 (S4020). If it is determined in S4020 that the same user ID exists, a return to S4010 corresponding to the arrow for "Yes" is made to accept different authentication information from the user, since the existence of user IDs identical to each other in the authentication system of one server is not permitted. New user authentication information is again accepted. If it is determined in S4020 that the same user ID does not exist, an advance to S4030 corresponding to the arrow for "No" is made.

In S4030, the server 300-1 identifies, by using the authentication policy table stored in its storage, some of the servers existing in the federated computing environment 100 as one having the authentication system using the same authentication policy as its authentication policy. Subsequently, the server 300-1 determines whether or not the same user ID as the user ID contained in the new user authentication information exists in the authentication information LDAP 326 in one of the servers identified in S4030 as one having the authentication system using the same authentication policy as its authentication policy (S4040).

If it is determined in S4040 that the same user ID does not exist in the authentication information LDAP 326 in one of the servers identified in S4030, a move to S4080 corresponding to the arrow for "No" is made for determination as to whether or not another or more of the servers have been identified in S4030 as ones having the authentication systems using the same authentication policy as the authentication policy of the server 300-1.

If it is determined in S4040 that the same user ID exists in the authentication information LDAP 326 in one of the servers identified in S4030, an advance to S4050 corresponding to the arrow for "yes" is made and the exceptional ID registration check frame shown in FIG. 6 is displayed on the client operated by the user attempting to register authentication information. Since the exceptional ID registration check frame has already been described in the description with reference to FIG. 3, no further detailed description of the exceptional ID registration check frame will be made.

A move to S4060 is then made and the user attempting to register authentication information presses the "Register" button in the exceptional ID check frame if the user has determined that the user ID displayed on the exceptional ID check frame is different from the one used by him/her. An advance to S4070 in the flow is made in response to pressing of the "Register" button and the user ID is registered in the exceptional ID table 325. Thereafter, a move to S4080 corresponding to the arrow for "No" is made for determination as to whether or not another or more of the servers have been identified in S4030 as ones having the authentication systems using the same authentication policy as the authentication policy of the server 300-1.

In S4060, the user attempting to register authentication information presses the "Do not register" button in the exceptional ID check frame if the user has determined that the user ID displayed on the exceptional ID check frame is the one used by him/her. In response to pressing of the "Do not register" button, a move to S4080 corresponding to the arrow for "Yes" is made for determination as to whether or not another or more of the servers have been identified in S4030 as ones having the authentication systems using the same authentication policy as the authentication policy of the server 300-1.

In S4080, determination is made as to whether or not another or more of the servers have been identified in S4030 as ones having the authentication systems using the same authentication policy as the authentication policy of the server 300-1. If it is determined in S4080 that another of the servers using the same authentication policy has been identified, a return to S4040 in the flow is made and the steps S4040 to S4070 are executed with respect to the another identified server. Thus, the server 300-1 registers necessary information in the exceptional ID table. If it is determined in S4080 that none of the other servers has been identified as one using the same authentication policy, an advance to S4090 corresponding to the arrow for "No" is made and the server 300-1 registers the new user authentication information in its authentication information LDAP 326.

FIG. 5 is a flowchart showing the flow of user authentication in this embodiment of the present invention. The flow of user authentication in a case where an access request is sent from the client 100 operated by an unauthenticated user to the server 300-1, which is one of the plurality of servers included in the federated computing environment 1000 will be described below in detail with reference to the flowchart of FIG. 5. It is to be noted that user authentication in each of the authentication systems of the other servers 300-2 to 300-N can be implemented as the same processing.

The server 300-1 receives an access request from the user (S5010) for accessing the federated computing environment. In a case where the server 300-1 determines that the user sending the access request is unauthenticated by examining whether or not the security token is included in the access request, the server 300-1 transmits data on an authentication mode selection frame shown in FIG. 7 to the client operated by the user to ask the user to select an authentication mode (S5020). If the user selects a multiple authentication mode by pressing a "Yes" button in the authentication mode selection frame shown in FIG. 7 by way of example, the process advances to S5040. If the user selects a normal authentication mode by pressing a "No" button in the authentication mode selection frame shown in FIG. 7 by way of example, the process moves to S5030 and user authentication is performed as normal authentication without using the authentication policy table. Since the normal authentication is well known, no detailed description will be made of the normal authentication.

Subsequently, the server 300-1 transmits to the user client data on an authentication frame shown in FIG. 8 (S5040), which frame is used in the multiple authentication mode. The user receives the data on the authentication frame and inputs authentication information (S5050). The client transmits the input authentication information to the server 300-1.

More specifically, in a case where user authentication is performed by using a user ID, the user inputs input the user ID to the first row in the authentication information input frame shown in FIG. 8 by operating a keyboard. In a case where user authentication is performed without using any user ID, the user checks a "Do not use" check box in the first row. In a case where user authentication is performed by using a password, the user inputs a password to the second row in the authentication frame shown in FIG. 8 by operating the keyboard. In a case where user authentication is performed without using any password, the user checks a "Do not use" check box in the second row. In a case where user authentication is performed as fingerprint authentication, voice print authentication or the like using data other than text data (i.e., binary data), the user presses an "OK" button without checking a "Do not use" check box in the third row in the authentication frame shown in FIG. 8 and subsequently inputs binary data (for example, by putting his/her finger on a fingerprint data input pad for fingerprint authentication, or uttering a voice to a microphone for voice print authentication).

The process advances to S5060 and the server 300-1 obtains, by referring to its authentication policy table, addresses for one or more servers using the authentication policy matching the authentication information input by the user (S5060). For example, in a case where the server 300-1 uses the authentication policy table shown in FIG. 9 and the authentication information includes a user ID "XYZ001" and a password "WXYZ", the authentication information matches the authentication policy using a user ID formed of "three alphabetic characters three numeric characters" and a password formed of "four alphabetic characters", and the server 300-1 therefore obtains three addresses "server300-1.com", "server300-2.com" and "server300-3.com".

Subsequently, the server 300-1 determines whether or not the user ID contained in the authentication information from the user is registered in the exceptional ID table by inquiring of the server indicated by the address obtained in S5060 (S5070). If it is determined that the user ID contained in the authentication information is registered in the exceptional ID table, a move to S5080 corresponding to the arrow for "Yes" is made and exception processing is performed. From the user ID registered in the exceptional ID table, it is not possible to determine in which authentication system user authentication should be performed. In exception processing, therefore, the server 300-1 sends back a message "The multiple authentication mode cannot be used because this user ID is an exceptional ID. Please perform ordinary authentication for user authentication" to the user client and terminates the processing.

If it is determined in S5070 that the user ID contained in the authentication information from the user is not registered in the exceptional ID table of any of the servers, an advance to S5090 corresponding to the arrow for "No" is made. In S5090, the server 300-1 transmits the authentication information to the server having the matching authentication policy by using the address obtained in S5060 and performs user authentication by using the authentication mechanism of the server receiving the authentication information. Preferably, the server 300-1 determines from which server user authentication should be performed according to the priority values in an authentication policy table. For example, in a case where the server 300-1 uses the authentication policy table shown in FIG. 9 and obtains three addresses "server300-1.com", "server300-2.com" and "server300-3.com" in S5070, the server 300-1 first attempts user authentication with the authentication system at "server300-1.com" assigned the highest priority value.

The process advances to S5100. If it is determined that user authentication has resulted in success, the server that has performed user authentication obtains identity information (S5110), forms a credential and cookie by using the obtained identity information, and sends back the credential and cookie to the user (S5120). The credential and cookie may be formed and sent back to the user by the server 300-1 notified of success in user authentication from the server that has performed user authentication. The user uses the received credential and cookie to be permitted to access the federated computing environment 1000. The authentication processing is thus completed.

This embodiment of the present invention has been described with respect to a mode in which a credential and cookie are used to permit a user to access the federated computing environment. However, it is apparent to those skilled in the art that URL encoding, or an Security Assertion Markup Language (SAML) token or any other well-known authentication technique can be used as an alternative to the credential and cookie.

If it is determined in S5100 that user authentication has ended in failure, determination is then made as to whether or not another or more of the other servers are still remaining as ones having the authentication policy matching the authentication information from the user identified in S5060 (S6130). If it is determined in S5130 that some of the servers having the authentication policy matching the authentication information from the user identified in S5060 are remaining, a return to S5090 in the flow is made and user authentication is again attempted by performing the processing in S5090 and the other subsequent steps with respect to the remaining servers. In the case where the server 300-1 uses the authentication policy table shown in FIG. 9 and has obtained three addresses "server300-1.com", "server300-2.com" and "server300-3.com" in S5070, and where authentication by the authentication system at "server300-1.com" has ended in failure, the server 300-1 attempts user authentication with the authentication system at "server300-2.com" assigned the next highest priority value. If this authentication results in failure, then the server 300-1 attempts user authentication with the authentication system at "server300-3.com"

If it is determined in S5130 that no server having the authentication policy matching the identified authentication information from the user is remaining, that is, authentication has ended in failure in all the servers, an advance to S5140 in the flow is made and the user, who has not been authenticated, is not permitted to access the federated computing environment 1000, thus completing the authentication processing.

FIG. 11 is a diagram showing an example of a hardware configuration of a computer suitable for implementation of the server 300 used in the embodiment of the present invention. The server 300 includes a central processing unit (CPU) 1 and a main memory 4. The CPU 1 and the main memory 4 are connected by a bus 2 to a hard disk unit 13 provided as an auxiliary storage unit. Removable storages (external storage systems capable of changing a recording medium) including a flexible disk unit 20, an MO unit 28 and a CR-ROM units 26 and 29 are also connected to the bus 2 through a flexible disk controller 19, an IDE controller 25 and a SCSI controller 27 associated with them.

Recording mediums such as a flexible disk, an MO and a CD-ROM are respectively inserted in the removable storages including the flexible disk unit 20, the MO unit 28 and the CR-ROM units 26 and 29. Codes of computer programs which cooperate with an operating system to provide instructions to the CPU and so on to implement the present invention can be recorded on the mediums including the flexible disk, the hard disk unit 13 and a ROM 14. Each computer program can be executed by being loaded in the main memory 4. Each computer program may be compressed or may be divided into a plurality of pieces to be recorded on a plurality of mediums.

The server 300 further has, as pieces of user interface hardware, a pointing device 7 such as a mouse, a keyboard 6 and a display 12 for presenting visual data to a user. Also, the server 300 can be connected to a printer (not shown) via a parallel port 16 and connected to a modem (not shown) via a serial port 15. The server 300 can be connected to a network via the serial port 15, the modem, a communication adapter 18 (an Ethernet® card or a token ring card) or the like to perform communication with other computers or the like.

A speaker 23 receives via an amplifier 22 an audio signal D/A (digital-to-analog) converted by an audio controller 21, and outputs the audio signal as a sound. The audio controller 21 enables sound information outside the system to be taken into the system by receiving the sound information through a microphone 24 and A/D (analog-to-digital) converting the sound information.

From the above description, it can be easily understood that the server 300 in the embodiment of the present invention is implemented as an information processor such as a main frame, a work station or an ordinary personal computer (PC) or a combination of some of these. However, these components are only an example and not all the components are essential to the present invention.

Even if the removable storages including the flexible disk unit 20, the MO unit 28 and the CR-ROM units 26 and 29, the parallel port 16, the printer, the serial port 15, the modem, the communication adapter 18, the speaker 23, the audio controller 21, the amplifier 22 and the microphone 24 in the hardware configuration described above, in particular, are not provided, the embodiment of the present invention can be implemented. Therefore, it is not necessary to include these components in the server 300 in the embodiment of the present invention.

Various changes in the present invention, for example, changes made in such a manner that each hardware component of the server 300 is formed by a combination of a plurality of machines implemented by being respectively assigned necessary functions can easily be thought of those skilled in the art, and the concepts of such changes are, of course, included in the spirit of the present invention.

As an operating system in the server 300, one supporting a GUI multiple window environment, such as a Windows® operating system provided by Microsoft Corporation, AIX provided by International Business Machines Corporation, MacOS provided by Apple Computer Incorporated or Linux, may be adopted.

As an operating system in the server 300, one in a character base environment, such as PC-DOS provided by International Business Machines Corporation or MS-DOS provided by Microsoft Corporation, may be adopted. Further, a real-time OS, such as OS/Open provided by International Business Machines Corporation or Vx Works from Wind River Systems, Inc., or an network computer-incorporated operating system, such as Java® OS, may be adopted for the server 300.

It can be understood from the above that the server 300 is not limited to a particular operating system environment. Needless to say, the servers 300-1 to 300-N may respectively operate in different operating system environments.

According to this embodiment, a user inputs authentication information with respect to the authentication system of some of the servers in the federated computing environment 1000 to undergo user authentication without memorizing the correspondence between the authentication system of the server and the authentication information and without being acutely conscious of in which authentication system the user is attempting authentication.

In this embodiment, user authentication is performed only in the authentication system of the server using the authentication policy conforming to the authentication information received from a user, thus realizing high-speed user authentication.

It can be easily understood that the present invention enables implementation of more convenient user authentication in a federated computing environment.

While the present invention has been described with respect to an embodiment thereof, the technical scope of the present invention is not limited to the scope described above with respect to the embodiment. It is apparent to those skilled in the art that various changes and modifications can be made in the above-described embodiment. Therefore, forms including such changes or modifications are, of course, included in the technical scope of the present invention.

BRIEF DESCRIPTION OF THE DRAWINGS

FIG. 1 is a diagram schematically showing an example of a system configuration of a federated computing environment 100 in an embodiment of the present invention;

FIG. 2 is a functional block diagram of a server 300 in the embodiment of the present invention;

FIG. 3 is a flowchart showing the flow of operations for establishing trusting relationships among servers in the embodiment of the present invention;

FIG. 4 is a flowchart showing the flow of operations for registering new user authentication information in the embodiment of the present invention;

FIG. 5 is a flowchart showing the flow of operations for user authentication in the embodiment of the present invention;

FIG. 6 is a diagram showing an image of an exceptional ID registration check frame in the embodiment of the present invention;

FIG. 7 is a diagram showing an image of an authentication mode selection frame in the embodiment of the present invention;

FIG. 8 is a diagram showing an image of an authentication information input frame in the embodiment of the present invention;

FIG. 9 is a diagram schematically showing an example of an authentication policy table 324 in the embodiment of the present invention;

FIG. 10 is a diagram schematically showing an example of an exceptional ID table 325 in the embodiment of the present invention; and FIG. 11 is a diagram showing an example of a hardware configuration of a computer which functions as the server 300 in the embodiment of the present invention.

The invention claimed is:

1. A method for recording server authentication information, said method comprising:
establishing, by a first server of a plurality of servers in a federated computing environment, a trusting relationship between the first server and a second server of the plurality of servers, wherein said establishing the trusting relationship comprises exchanging, by the first server, an electronic certificate of the first server with an electronic certificate of the second server in accordance with a Public Key Infrastructure (PKI) method;
after said establishing the trusting relationship, obtaining by the first server an authentication policy of the second server, wherein an authentication policy for each server of the plurality of servers is defined as at least one rule of each server for authenticating users of the federated computing environment; and
after said obtaining the authentication policy of the second server, registering by the first server the authentication policy of the second server within the first server, wherein the at least one rule consists of four rules, said four rules consisting of a number of alphabetic characters of a user identification (ID), a number of numeric characters of the user ID, a data size for fingerprint authentication, and a data size for voice print authentication.

2. The method of claim 1, wherein said registering the authentication policy of the second server comprises registering the authentication policy of the second server in an authentication policy table of the first server, wherein the authentication policy table of the first server comprises an authentication policy of each server of the plurality of servers registered therein, and wherein the authentication policy table of the first server further comprises:
   a server address of each server registered therein; and
   a relative priority of each server of a group of servers having a same authentication policy in the authentication policy table.

3. The method of claim 1, wherein said registering the authentication policy of the second server comprises registering the authentication policy of the second server in an authentication policy table of the first server, wherein the authentication policy table of the first server comprises an authentication policy of each server of the plurality of servers registered therein, wherein the authentication policy of the second server is identical to an authentication policy of the first server, wherein a first common user identifier (ID) exists in an authentication information Lightweight Directory Access Protocol (LDAP) of the first server and in an authentication information LDAP of the second server, wherein the first common user ID is used by a first user in the first server and by a second user in the second server such that the second user differs from the first user, and wherein the method further comprises:
   after said registering the authentication policy of the second server, registering by the first server the first common user ID in a exceptional ID table of the first server, wherein the exceptional ID table of the first server stores common user IDs and an indication of one or more servers associated with each common user ID stored in the exceptional ID table of the first server.

4. A method for recording server authentication information, said method comprising:
   establishing, by a first server of a plurality of servers in a federated computing environment, a trusting relationship between the first server and a second server of the plurality of servers, wherein said establishing the trusting relationship comprises exchanging, by the first server, an electronic certificate of the first server with an electronic certificate of the second server in accordance with a Public Key Infrastructure (PKI) method;
   after said establishing the trusting relationship, obtaining by the first server an authentication policy of the second server, wherein an authentication policy for each server of the plurality of servers is defined as at least one rule of each server for authenticating users of the federated computing environment; and
   after said obtaining the authentication policy of the second server, registering by the first server the authentication policy of the second server within the first server,
   wherein the method further comprises:
   receiving, by the first server, an access request from a user to access the federated computing environment, wherein the first server comprises an authentication policy table that comprises the authentication policy of each server of the plurality of servers registered therein;
   after said receiving the access request, receiving by the first server input authentication information from the user;
   obtaining, by the first server, a server address of the second server, wherein the authentication policy of the second server matches an authentication policy of the first server;
   transmitting, by the first server to the second server via the server address of the second server, the input authentication information;
   after said transmitting the input authentication information to the second server, receiving by the first server from the second server a notification that the second server has successfully authorized the user; and
   after said receiving the notification that the second server has successfully authorized the user, permitting the user to access the federated computing environment, wherein said permitting is performed by the first server.

5. The method of claim 4, wherein after said transmitting the input authentication information to the second server and before said permitting the user to access the federated computing environment, the method further comprises:
   receiving by the first server from the second server a token that may be used by the user to access the federated computing environment; and
   sending, by the first server, the token to the user.

6. The method of claim 5, wherein the token is a credential and a cookie.

7. The method of claim 4, wherein the at least one rule includes a data size for fingerprint authentication, a data size for voice print authentication, or a combination thereof.

8. A system for recording server authentication information, said system comprising:
   a first server of a plurality of servers in a federated computing environment; and
   a computer readable storage medium;
   first program code for establishing, by the first server, a trusting relationship between the first server and a second server comprised by the plurality of servers, wherein said establishing the trusting relationship comprises exchanging, by the first server, an electronic certificate of the first server with an electronic certificate of the second server in accordance with a Public Key Infrastructure (PKI) method;
   second program code for obtaining by the first server an authentication policy of the second server after said establishing the trusting relationship, wherein an authentication policy for each server of the plurality of servers is defined as at least one rule of each server for authenticating users of the federated computing environment; and
   third program code for registering by the first server the authentication policy of the second server within the first server after said obtaining the authentication policy of the second server, wherein the first program code, the second program code, and the third program code are stored on the computer readable storage medium, and wherein the at least one rule consists of four rules, said four rules consisting of a number of alphabetic characters of a user identification (ID), a number of numeric characters of the user ID, a data size for fingerprint authentication, and a data size for voice print authentication.

9. The system of claim 8, wherein said third program code for registering the authentication policy of the second server comprises code for registering the authentication policy of the second server in an authentication policy table of the first server, wherein the authentication policy table of the first server comprises an authentication policy of each server of the plurality of servers registered therein, wherein the authentication policy table of the first server further comprises:
- a server address of each server registered therein; and
- a relative priority of each server of a group of servers having a same authentication policy in the authentication policy table.

10. The system of claim 8, wherein said third program code for registering the authentication policy of the second server comprises code for registering the authentication policy of the second server in an authentication policy table of the first server, wherein the authentication policy table of the first server comprises an authentication policy of each server of the plurality of servers registered therein, wherein the authentication policy of the second server is identical to an authentication policy of the first server, wherein a first common user identifier (ID) exists in an authentication information Lightweight Directory Access Protocol (LDAP) of the first server and in an authentication information LDAP of the second server, wherein the first common user ID is used by a first user in the first server and by a second user in the second server such that the second user differs from the first user, and wherein the system further comprises:
- program code, stored on the computer readable storage medium, for registering by the first server the first common user ID in a exceptional ID table of the first server after said registering the authentication policy of the second server, wherein the exceptional ID table of the first server stores common user IDs and an indication of one or more servers associated with each common user ID stored in the exceptional ID table of the first server.

11. A system for recording server authentication information, said system comprising:
- a first server of a plurality of servers in a federated computing environment; and
- a computer readable storage medium;
- first program code for establishing, by the first server, a trusting relationship between the first server and a second server comprised by the plurality of servers, wherein said establishing the trusting relationship comprises exchanging, by the first server, an electronic certificate of the first server with an electronic certificate of the second server in accordance with a Public Key Infrastructure (PKI) method;
- second program code for obtaining by the first server an authentication policy of the second server after said establishing the trusting relationship, wherein an authentication policy for each server of the plurality of servers is defined as at least one rule of each server for authenticating users of the federated computing environment; and
- third program code for registering by the first server the authentication policy of the second server within the first server after said obtaining the authentication policy of the second server,
- wherein the first program code, the second program code, and the third program code are stored on the computer readable storage medium, and
- wherein the system further comprises:
  - fourth program code for receiving, by the first server, an access request from a user to access the federated computing environment, wherein the first server comprises an authentication policy table that comprises the authentication policy of each server of the plurality of servers registered therein;
  - fifth program code for receiving by the first server input authentication information from the user after said receiving the access request;
  - sixth program code for obtaining, by the first server, a server address of the second server, wherein the authentication policy of the second server matches an authentication policy of the first server;
  - seventh program code for transmitting, by the first server to the second server via the server address of the second server, the input authentication information;
  - eighth program code for receiving by the first server from the second server a notification that the second server has successfully authorized the user after said transmitting the input authentication information to the second server; and
  - ninth program code for permitting the user to access the federated computing environment, wherein said permitting is performed by the first server after said receiving the notification that the second server has successfully authorized the user,
  - wherein the fourth program code, the fifth program code, the sixth program code, the seventh program code, the eighth program code, and the ninth program code are stored on the computer readable storage medium.

12. The system of claim 11, wherein the system further comprises:
- tenth program code for receiving by the first server from the second server a token that may be used by the user to access the federated computing environment after said transmitting the input authentication information to the second server and before said permitting the user to access the federated computing environment; and
- eleventh program code for sending, by the first server, the token to the user,
- wherein the tenth program code and the eleventh program code are stored on the computer readable storage medium.

13. The system of claim 12, wherein the token is a credential and a cookie.

14. The system of claim 11, wherein the at least one rule includes a data size for fingerprint authentication, a data size for voice print authentication, or a combination thereof.

15. A computer program product for recording server authentication information, said computer program product comprising:
- a computer readable storage medium;
- first program code for establishing, by a first server of a plurality of servers, a trusting relationship between the first server and a second server comprised by the plurality of servers, wherein said establishing the trusting relationship comprises exchanging, by the first server, an electronic certificate of the first server with an electronic certificate of the second server in accordance with a Public Key Infrastructure (PKI) method;
- second program code for obtaining by the first server an authentication policy of the second server after said establishing the trusting relationship, wherein an authentication policy for each server of the plurality of servers is defined as at least one rule of each server for authenticating users of the federated computing environment; and
- third program code for registering by the first server the authentication policy of the second server within the first server after said obtaining the authentication policy of the second server, wherein the first program code, the second program code, and the third program code are stored on the computer readable storage medium and wherein the at least one rule consists of four rules, said four rules consisting of a number of alphabetic characters of a user identification (ID), a number of numeric characters of the user ID, a data size for fingerprint authentication, and a data size for voice print authentication.

16. The computer program product of claim 15, wherein said third program code for registering the authentication policy of the second server comprises code for registering the authentication policy of the second server in an authentication policy table of the first server, wherein the authentication policy table of the first server comprises an authentication policy of each server of the plurality of servers registered therein, wherein the authentication policy table of the first server Further comprises:
   a server address of each server registered therein; and
   a relative priority of each server of a group of servers having a same authentication policy in the authentication policy table.

17. The computer program product of claim 15, wherein said third program code for registering the authentication policy of the second server comprises code for registering the authentication policy of the second server in an authentication policy table of the first server, wherein the authentication policy table of the first server comprises an authentication policy of each server of the plurality of servers registered therein, wherein the authentication policy of the second server is identical to an authentication policy of the first server, wherein a first common user identifier (ID) exists in an authentication information Lightweight Directory Access Protocol (LDAP) of the first server and in an authentication information LDAP of the second server, wherein the first common user ID is used by a first user in the first server and by a second user in the second server such that the second user differs from the first user, and wherein the computer program product further comprises:
   program code, stored on the computer readable storage medium, for registering by the first server the first common user ID in a exceptional ID table of the first server after said registering the authentication policy of the second server, wherein the exceptional ID table of the first server stores common user IDs and an indication of one or more servers associated with each common user ID stored in the exceptional ID table of the first server.

18. A computer program product for recording server authentication information, said computer program product comprising:
   a computer readable storage medium;
   first program code for establishing, by a first server of a plurality of servers, a trusting relationship between the first server and a second server comprised by the plurality of servers, wherein said establishing the trusting relationship comprises exchanging, by the first server, an electronic certificate of the first server with an electronic certificate of the second server in accordance with a Public Key Infrastructure (PKI) method;
   second program code for obtaining by the first server an authentication policy of the second server after said establishing the trusting relationship, wherein an authentication policy for each server of the plurality of servers is defined as at least one rule of each server for authenticating users of the federated computing environment; and
   third program code for registering by the first server the authentication policy of the second server within the first server after said obtaining the authentication policy of the second server,
   wherein the first program code, the second program code, and the third program code are stored on the computer readable storage medium, and
   wherein the computer program product further comprises:
      fourth program code for receiving, by the first server, an access request from a user to access the federated computing environment, wherein the first server comprises an authentication policy table that comprises the authentication policy of each server of the plurality of servers registered therein;
      fifth program code for receiving by the first server input authentication information from the user after said receiving the access request;
      sixth program code for obtaining, by the first server, a server address of the second server, wherein the authentication policy of the second server matches an authentication policy of the first server;
      seventh program code for transmitting, by the first server to the second server via the server address of the second server, the input authentication information;
      eighth program code for receiving by the first server from the second server a notification that the second server has successfully authorized the user after said transmitting the input authentication information to the second server; and
      ninth program code for permitting the user to access the federated computing environment, wherein said permitting is performed by the first server after said receiving the notification that the second server has successfully authorized the user,
      wherein the fourth program code, the fifth program code, the sixth program code, the seventh program code, the eighth program code, and the ninth program code are stored on the computer readable storage medium.

19. The computer program product of claim 18, wherein the computer program product further comprises:
   tenth program code for receiving by the first server from the second server a token that may be used by the user to access the federated computing environment after said transmitting the input authentication information to the second server and before said permitting the user to access the federated computing environment; and
   eleventh program code for sending, by the first server, the token to the user,
   wherein the tenth program code and the eleventh program code are stored on the computer readable storage medium.

20. The computer program product of claim 19, wherein the token is a credential and a cookie.

21. The computer program product of claim 18, wherein the at least one rule includes a data size for fingerprint authentication, a data size for voice print authentication, or a combination thereof.

* * * * *